March 7, 1950 N. H. YOUNG, JR., ET AL 2,499,443
WIDE RANGE AMPLIFIER
Filed July 27, 1946
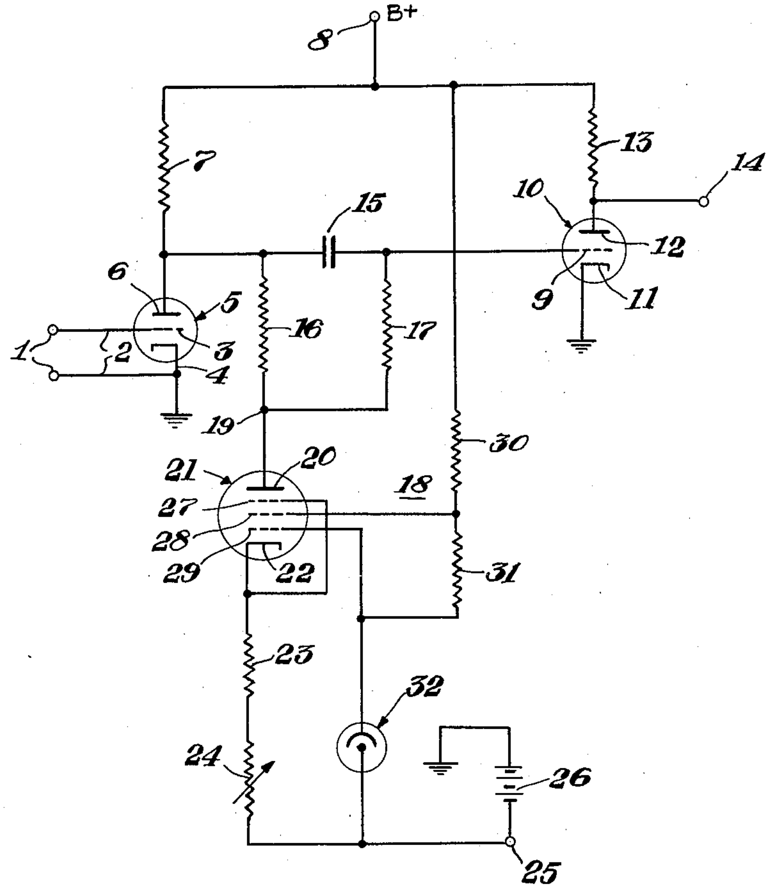
INVENTORS
NORMAN H. YOUNG, JR.
LOUIS W. PARKER
BY
R P Morris
ATTORNEY Patented Mar. 7, 1950

2,499,443

UNITED STATES PATENT OFFICE 2,499,443

WIDE RANGE AMPLIFIER

Norman H. Young, Jr., and Louis W. Parker, Jackson Heights, N. Y., assignors to Federal Telecommunication Laboratories, Inc., New York, N. Y., a corporation of Delaware Application July 27, 1946, Serial No. 686,688

1 Claim. (Cl. 179—171)

This invention relates generally to coupling devices, and particularly to coupling devices for interstage transfer of direct current or slowly varying components of video signals in multi-stage video amplifiers.

It is an object of the invention to provide a novel multi-stage video amplifier circuit.

It is a further object of the invention to provide a circuit device for providing bucking voltages for multistage D. C. amplifiers.

It is still a further object of the invention to provide a constant current circuit of novel design.

It is another object of the invention to provide a circuit device for maintaining the potential difference between the ends of an interstage coupling resistance at a constant value, during changes of signal potential applied to the resistance.

It is still another object of the invention to provide an interstage coupling device capable of translating direct current or slowly varying components of a video signal between stages of a multi-stage amplifier without accompanying transfer of supply voltages between the stages.

A further object of the invention resides in the provision of a coupling device which utilizes a purely resistive transfer network for direct current signals, the voltage drop across a portion of the network being maintained constant and independent of signal voltages occurring therein.

The above and still further objects and advantages of the invention will become clear upon study of the following detailed description of an embodiment of the invention, when taken in conjunction with the accompanying drawings wherein:

The single figure is a circuit diagram of two stages of a multi-stage amplifier, utilizing the principles of the invention.

In general, our novel interstage coupling circuit involves a network for transfer of D. C. or slowly varying signals, or D. C. components of a video signal, from the plate circuit of one stage of a multi-stage amplifier to the grid of a succeeding stage. In order to transfer signals of the above character while operating the corresponding vacuum tube elements in the various stages of the amplifier at similar potentials, it is requisite to provide a D. C. coupling network which avoids transfer of supply potential from the plate of one tube to the grid of a succeeding tube. In the present invention, coupling takes place from the plate of one tube to the grid of a succeeding tube of a multi-stage amplifier over a resistance which is connected in series with a constant current device to a point of high negative potential, sufficient voltage drop being thus produced in the coupling resistance to enable direct coupling thereof to the succeeding grid. The utilization of a constant current device in series with the coupling resistance to produce a constant voltage drop in the resistance which is independent of signal magnitudes or variations, assures that the plate connected end of the coupling resistance and the grid connected end thereof will be maintained at a constant potential difference. Changes of potential at the plate end of the coupling resistance take place at one voltage level, and are accompanied by corresponding changes at the grid end, at a lower voltage level, suitable for direct application to the grid.

The constant current device connected in series with the coupling resistance, above referred to, preferably comprises a pentode tube, an extremely powerful negative feedback effect being provided by means of unby-passed resistances connected in the cathode circuit of the tube. The control grid of the tube is maintained at a fixed potential, whereby changes in plate current modify the cathode potential with respect to that of the control grid, and in such sense as to reduce plate current changes.

Referring now specifically to the single figure of the drawings, the numeral 1 denotes input terminals for a video signal, which may have components extending from direct current or zero frequency to the highest video frequencies. The terminals 1 are connected over leads 2 to the grid 3 and the grounded cathode 4 of a vacuum tube 5, which is shown as a triode for the sake of simplicity. The plate 6 of vacuum tube 5 is supplied with plate voltage over a suitable load resistance 7 from a terminal 8, which is connected to a suitable source of direct current at positive polarity, (not shown). Associated with the resistance 7 may be a high frequency peaking network of conventional design, and which has been omitted from the drawings to avoid unnecessary complication thereof.

Voltage variations occurring at the plate 6 of tube 5 are transferred to the grid 9 of a tube 10, which is illustrated as a triode having a grounded cathode 11 and a plate 12, for the sake of simplicity, but which may utilize grids additional to the control grid 9, as necessary to obtain suitable operating characteristics. The plate circuit for tube 10 comprises the usual resistance 13 and a high frequency peaking network of conventional character (not shown). Output signal may be derived from a terminal 14 connected directly to the plate 12.

Alternating current components of signals available at the plate 6 of tube 5 are transferred to the grid 9 of tube 10 by means of a coupling condenser 15, which is connected directly between plate 6 and grid 9. Transfer of direct current or slowly varying components of signal from plate 6 to grid 9 must obviously be accomplished over a network which includes no series capacitance. Nevertheless, it is impractical to apply the relatively high potential existing on the plate 6 directly to the grid 9, since such practice would necessitate suitable adjustment of the potential with respect to the ground at the cathode 11 of tube 10, a procedure which becomes impractical in multi-stage amplifiers. To avoid this necessity, D. C. and slow voltage variations are transferred from plate 6 to grid 9 over resistances 16 and 17 in series, the resistance 16, one end of which is connected directly to plate 6, being connected in series with a constant current device, identified generally by the numeral 18, and which serves to reduce the average voltage at the junction point 19 between resistances 16 and 17 to a value suitable for application as a bias voltage directly to grid 9 of tube 10. The utilization of a constant current device, such as is exemplified by device 18, is essential to assure that voltage variations at the plate 6 are reflected or reproduced at the junction 19, since thereby the voltage drop in resistance 16 is maintained at a predetermined value and a fixed difference of potential exists between the extremities of resistance 16.

Proceeding now to a detailed description of constant current device 18, plate 20 of pentode vacuum tube 21 is connected directly to the junction point 19, cathode 22 of tube 21 being connected in series with unby-passed resistances 23 and 24 to the negative terminal 25 of a voltage source 26, the positive terminal of which is grounded. Suppressor grid 27 of tube 21 is connected directly to cathode 22 in accordance with the usual practice. Operating potential for grids 28 and 29 of tube 21 are supplied over a voltage divider comprising a resistance 30, connected at one end thereof to terminal 7 and at the other to grid 28, a resistance 31 connected in series with resistance 30, and which develops operating potential for control grid 29, and a gas filled diode 32, connected between resistance 31 and negative terminal 25. Tube 32 is employed to maintain a fixed voltage drop of predetermined value on the grid 29, regardless of changes in supply voltage at terminal 8, such changes being ineffective to vary the voltage drop across the tube 32. Cathode resistances 23 and 24 are designed to produce a constant voltage drop, due to plate current flow therein, which is slightly less than the fixed voltage on grid 29, to maintain the grid 29 slightly negative with respect to cathode 22. Resistance 24 is made variable to enable suitable adjustment of the potential of cathode 22.

Resistances 23 and 24 provide a powerful negative feedback over diode 32, which acts to maintain constant current flow in tube 21, since any change in such current changes the voltage drop across resistances 23 and 24 in series, thereby changing the potential of cathode 22 with respect to that of terminal 25, and since grid 29 is maintained at a constant voltage with respect to terminal 25, by virtue of the action of tube 32, the relative potentials of cathode 22 and grid 29 change. An increase in plate current in tube 21 thus makes cathode 22 more positive, and hence increases the relative negative bias on grid 29, which in turn reduces plate current; a decrease in plate current makes cathode 22 more negative, decreasing the potential difference between cathode 22 and grid 29, which tends to increase flow of plate current. Since change of plate current flow in tube 21 may tend to take place due to change of supply voltage at either or both of terminals 8 and 25, it will be clear that the current flow through resistance 16 is maintained independent of variations in supply voltages by the action of constant current device 18.

While we have disclosed our novel circuit as utilizing a gaseous diode 32 to maintain the potential on control grid 29 at a constant value, we have found that satisfactory operation of the invention may be obtained under many practical conditions when a resistance is utilized in place of diode 32.

Having described a specific embodiment of the invention, it will be clear that modifications thereof may be resorted to without departing from the spirit of the invention, which is defined in the appended claim.

What we claim and desire to secure by Letters Patent of the United States is:

A multi-stage amplifier for broad band pass including unidirectional voltages comprising at least a first stage having an output circuit and a second stage having an input circuit, said output and input circuits being at different potential levels, a coupling circuit therebetween including a direct current path and an alternating current path connected in parallel and both connected directly between said input and output circuits, an electronic tube having a plate-cathode circuit connected in series with said direct current path, an operating potential source for said amplifier stages connected across said plate-cathode circuit, a resistance connected between the high potential side of said source and a grid of said tube, an unby-passed resistance connected between the low potential side of said source and the cathode of said tube, and a stabilizing gas-filled diode rectifier connected between said grid and said low potential side of said source whereby said tube provides a steady bucking current through said direct current path independent of variations of potential from said source.

NORMAN H. YOUNG, Jr.
LOUIS W. PARKER.

REFERENCES CITED

The following references are of record in the file of this patent:

UNITED STATES PATENTS

| Number | Name | Date |
|---|---|---|
| 2,252,645 | Rougvie | Aug. 12, 1941 |
| 2,274,365 | Gardiner | Feb. 24, 1942 |
| 2,392,415 | Soller | Jan. 8, 1946 |